June 7, 1966     L. BALAMUTH ETAL     3,254,402
METHOD AND APPARATUS FOR JOINING SHEET MATERIALS
Filed May 9, 1962     3 Sheets-Sheet 1
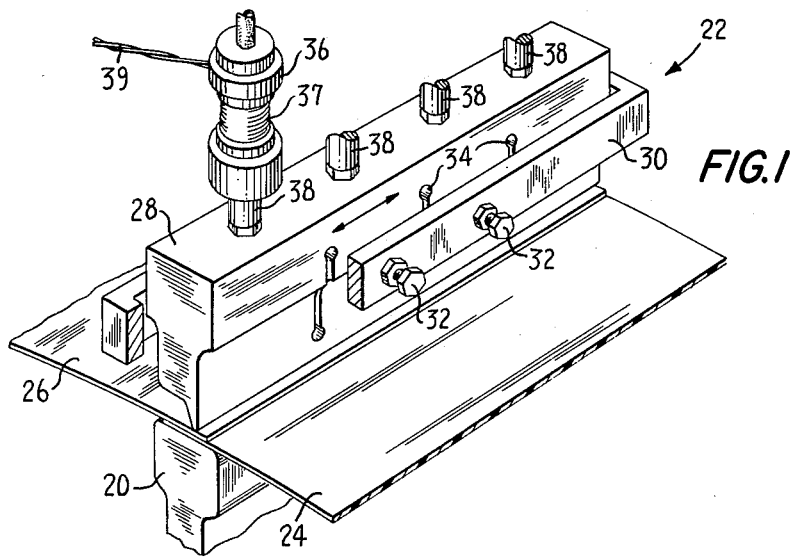
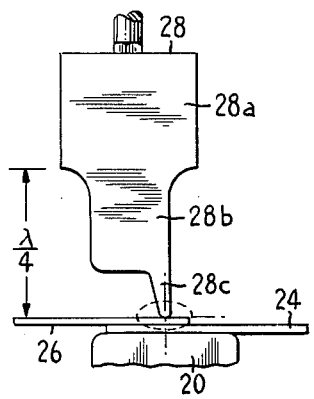
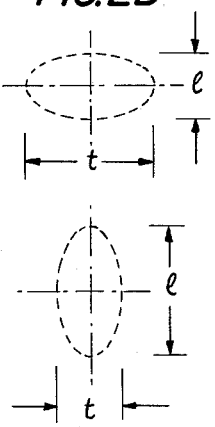
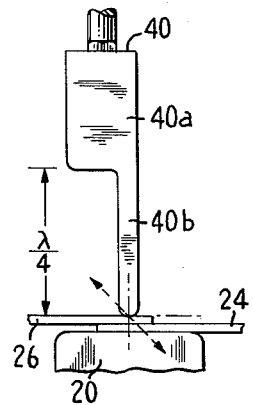
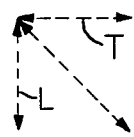
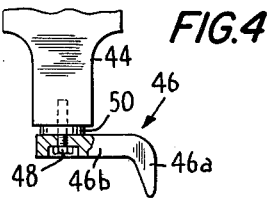
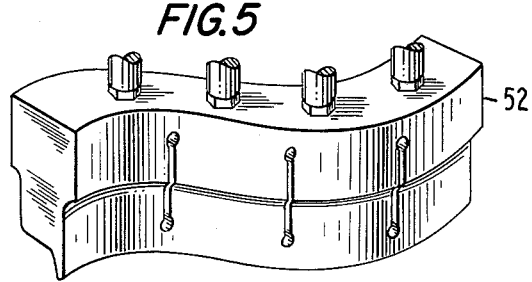
INVENTORS
LEWIS BALAMUTH &
ARTHUR KURIS
BY *Brumbaugh, Free, Graves & Donohue*
their    ATTORNEYS INVENTORS
LEWIS BALAMUTH &
ARTHUR KURIS
BY
their ATTORNEYS June 7, 1966 L. BALAMUTH ET AL 3,254,402
METHOD AND APPARATUS FOR JOINING SHEET MATERIALS
Filed May 9, 1962 3 Sheets-Sheet 3
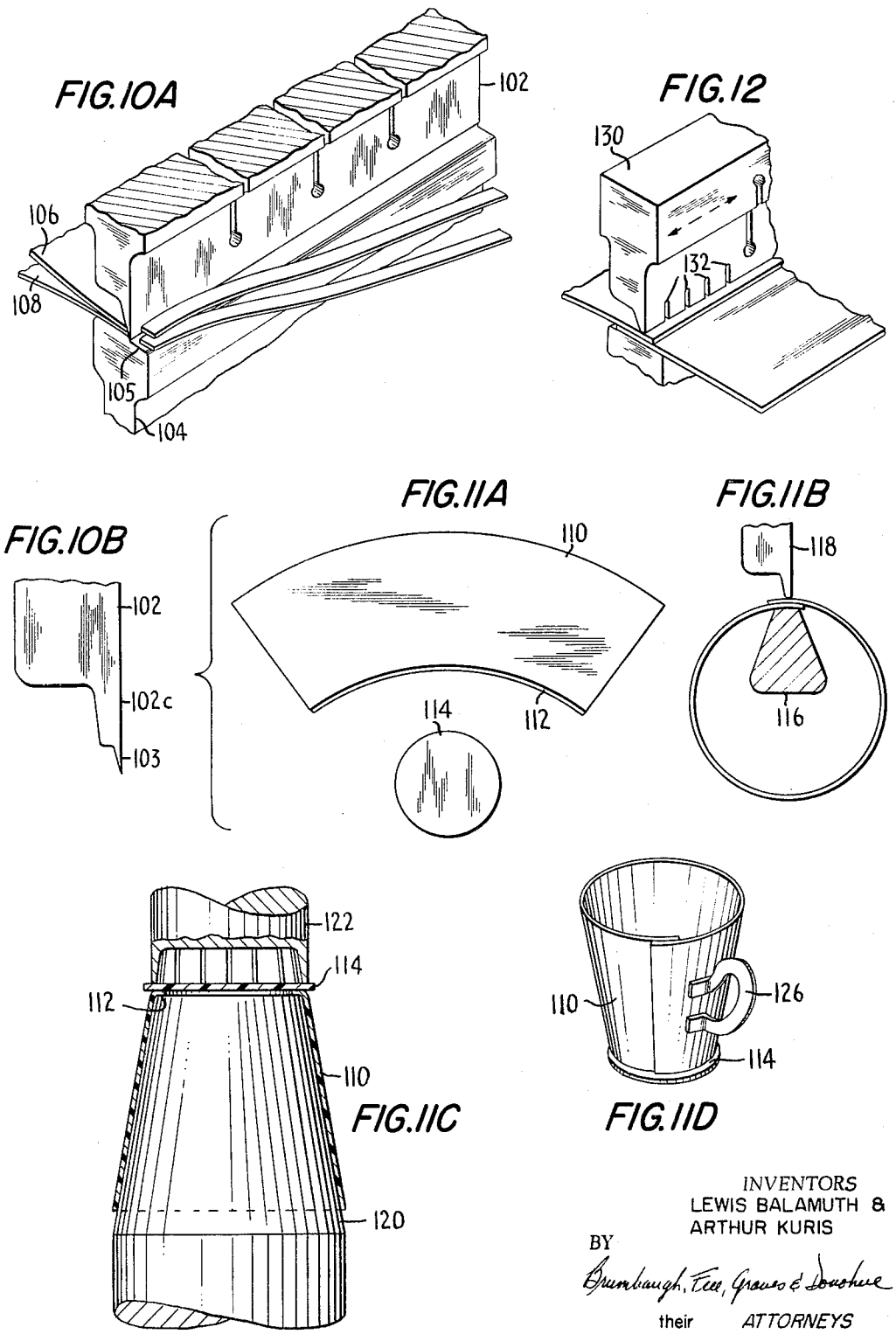
INVENTORS
LEWIS BALAMUTH &
ARTHUR KURIS
BY
Brumbaugh, Free, Graves & Donohue
their ATTORNEYS

United States Patent Office 3,254,402
Patented June 7, 1966

1

3,254,402
METHOD AND APPARATUS FOR JOINING
SHEET MATERIALS
Lewis Balamuth, Manhattan, and Arthur Kuris, Riverdale, N.Y., assignors to Cavitron Ultrasonics Inc., Long Island, N.Y., a corporation of New York
Filed May 9, 1962, Ser. No. 193,518
6 Claims. (Cl. 29—470)

This invention relates to the joinder of materials, and more and apparatus for permanently joining sheets of similar or dissimilar materials without the application of external heat.

Known methods of bonding thermoplastic materials, such as metals and plastics, generally involve the use of heat to soften or fuse the materials and permit their coalescence. While techniques employing heat produce satisfactory results, they suffer a number of disadvantages which render their use prohibitive in many applications. The apparatus required to generate the high temperatures necessary for the process and to apply them to the materials to be joined is costly and space consuming, and the heat applied to the materials must be carefully controlled to avoid burning or distortion of the materials. In some cases, while a satisfactory bond is produced, the adjacent areas of the materials are so deleteriously affected by the heat that the finished product is rendered unsatisfactory for use.

It has heretofore been proposed to utilize ultrasonic energy in place of heat to join sheet materials. The localized conversion of the vibratory energy into heat, without affecting appreciable areas of the materials adjacent the joint, makes the use of this phenomenon particularly attractive. Present techniques and apparatus, however, are limited in effectiveness and range of application.

In the welding of metal sheets, for example, in which relatively high temperatures are necessary to secure the weld, ultrasonic energy is applied to the area of the seam by contacting the upper surface of the metal adjacent to the seam with a member vibrating in a plane parallel thereto. This is, in effect, a rubbing of the surface to generate the heat and has been referred to as vibration in the "shear mode." At the same time, of course, it is necessary to apply substantial compressive forces to hold the sheets to be welded in intimate contact with one another.

In contrast to metal welding, prior art methods of sealing plastic films to each other operate at lower energies, since the high temperatures utilized in metal welding would burn or char plastics. Accordingly, ultrasonic plastic sealing techniques utilize vibratory motion applied perpendicular to the surface of the materials being joined. Relatively little heat is produced by such motion in the joint and the seal is effected by a combination of the low heat and the high pressures, static and dynamic, applied to the plastic.

As is obvious, ultrasonic apparatus designed say, for the welding of metals, could not be applied to a plastic sealing operation without considerable modification, and vice versa. Therefore, the use of presently known ultrasonic methods is economically justified only in situations where a great volume of work of one type only is to be performed. Another major disadvantage of the prior art sysetsm for ultrasonic welding or sealing lies in the fact that presently known equipment is capable of effecting the welding or sealing action over only a very small linear distance. Therefore, if an elongated joint or seam is to be made, repetitive application of the welding or sealing process is required. In some cases, this is overcome by utilizing continuous roller techniques, such as are described in the present inventors' copending application Serial No. 106,323, filed April 28, 1961, issued May 7, 1963, as Patent No. 3,088,323 and assigned to the present assignee. However, while the methods and apparatus illustrated in the copending application are satisfaotcry for the welding of materials having high melting points, such as metals, they are not applicable to the sealing of lower melting point materials such as plastics.

The primary object of the present invention is to provide improved methods and apparatus for the sealing or joining of materials.

A further object of the invention is to provide improved methods and apparatus for the joinder of materials utilizing ultrasonic energy.

Yet another object of this invention is to provide an improved method of effecting the joinder of relatively thin sheet materials by the application of ultrasonic energy thereto.

An additional object of this invention is to provide improved apparatus to permanently join sheet materials by application of ultrasonic energy thereto.

In accordance with the present invention, the materials to be joined are supported in contact with each other in the area of the joint and ultrasonic energy applied thereto. As opposed to either the shear mode or perpendicular vibrations of presently known methods, the vibratory energy of the present invention is so directed as to simultaneously provide components of motion both in shear and perpendicular to the surface. The two-directional motion may result from generating an orbital vibration at the contact edge of the vibratory element or by providing an element having its contact surface vibrating in a plane at an angle less than 90° to the plane of the materials.

In either case, by adjusting the relative magnitudes of the lateral and normal components of motion, the same apparatus can be used to join high melting point materials, such as metals, which require relatively large components in the lateral direction, and low melting point materials such as plastics, requiring motion predominantly normal to its plane. By properly proportioning the lateral and horizontal components of the vibratory motion, it has been found also to be effective in joining materials having dissimilar characteristics. For example, plastic may be effective sealed to paper without the danger of burning the paper, as readily occurs when using heat to produce the sealing.

The novel apparatus according to the invention comprises basically, a couple consisting of an anvil or stationary supporting portion, and a vibratory element providing the desired bi-directional ultrasonic energy. The vibratory element is arranged to supply ultrasonic energy over a considerable contact length at one time, without the necessity of moving the materials or element relative to each other. The vibratory element may be formed in either a straight line or in various curves, including closed figures such as rectangles, circles, etc., and are so arranged as to provide the requisite bi-directional vibratory motion.

Further objects, features and advantages of the present invention will become more apparent from the following detailed description thereof, when taken in conjunction with the accompanying drawings, in which:

FIGURE 1 illustrates in perspective the basic apparatus according to the present invention;

FIGURE 2a is an end view of the vibratory device shown in FIGURE 1 to aid in explaining its operation;

FIGURES 2b and 2c are useful in explaining the bi-directional motion induced in the vibratory device of FIGURE 2a;

FIGURE 3a illustrates an alternate type of vibratory device suitable for use in the apparatus of FIGURE 1;

FIGURE 3b is a vector diagram explaining the vibratory action of the device of FIGURE 3a;

FIGURE 4 illustrates a third type of vibratory device suitable for use in the apparatus of FIGURE 1;

FIGURE 5 illustrates the vibratory device of FIGURE 1 adapted to provide a seal over a curved surface;

FIGURE 8 is a modification of the device of FIGURE 6a;

FIGURE 9 is another modification of the device of FIGURE 6a;

FIGURES 10a and 10b show a modification of the device of FIGURE 1 wherein a cutting edge is provided thereon for simultaneously cutting the films being joined as they are being joined, such as would be useful in the production of plastic bags or the like;

FIGURES 11a through 11b illustrate the use of the straight line and circular sealing devices of the present invention applied to the fabrication of a product such as a drinking cup; and, FIGURE 12 is a fragmentary view of a modification of the vibratory device of the invention, suitable for incorporation in the arrangement of FIGURES 1, 5, or 10a.

Figure 6A:
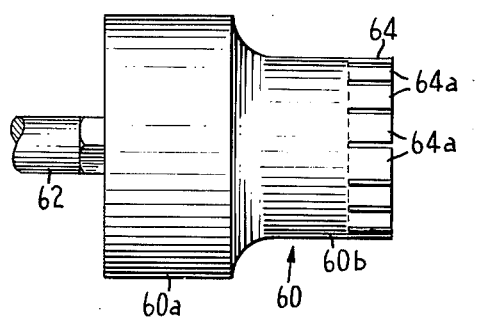
FIGURES 6a and 6b are side and end views respectively of a vibratory device operating in accordance with the principles of the invention for producing a seal or weld of circular form.

Referring now to FIGURE 1, there is illustrated therein apparatus according to the invention for welding or seaming sheet materials. As indicated by the cross hatching in the FIGURE, the materials illustrated are of plastic, but it will be realized that the sheets to be joined may be of any thermoplastic material or materials, capable of coalescing to form a bond therebetween. It will also be understood, that only one of the materials need be of this character, the other sheet, for example, being of a porous material into which the fusable material will penetrate. However, for the purpose of the explanation of the FIGURES to follow, it will be assumed that the apparatus is working with plastic sheet materials.

The basic structure for sealing sheet material comprises a stationary or anvil portion 20, rigidly supported in any convenient manner to provide a fixed, smooth upper surface to support the materials to be joined. For a simple overlap type of weld or seal, the plastic sheets 24, 26 are arranged to provide a small overlap on the anvil 20.

The active member of the apparatus is indicated generally at 22 and comprises an elongated vibratory element 28 supported within a rectangular frame member 30. The element 28 is preferably made of a metal such as aluminum or Monel, although any material capable of supporting vibration may be suitable. The element 28 is physically held within the member 30 by a plurality of set screws 32 threaded through the member 30 having interior pointed ends engaging small conical recesses provided in the surface of the vibratory member. Although two are shown in FIGURE 1, it will be understood that at least two others will be provided on the other side of the elongated member 28. The opposite ends of the frame member 30 may be provided with lugs or trunnions for support in a frame (not shown) which may be controlled by any suitable means to permit vertical motion of the entire structure 22.

The vibratory member 28 is set into ultrasonic vibration by means of a plurality of transducer units 36, only one of which is shown in its entirety. This transducer may be of any type capable of converting an alternating electrical voltage into a longitudinal mechanical vibration. One well known form of such structure comprises a stack of elongated narrow plates of magnetostrictive material, around which is coiled a conductor carrying the alternating voltage. The magnetostrictive stack elongates and contracts at the frequency of the applied voltage, providing a mechanical vibration at its ends. In the transducer 36, the vibrating stack is vertically disposed within the coil 37 to which alternating voltage at a suitable ultrasonic frequency is supplied via conductors 39.

The vibratory stack is rigidly coupled through a suitable connecting body to the upper surface of the vibratory element 28, by means of a coupling member 38. The latter may be provided with a threaded portion having an external hexagonal section to accommodate a wrench or other fastening tool. As can be seen from the figure, a plurality of such transducer units are provided, each coupled by a member 38 to a different segment of the vibratory element 28. By virtue of this arrangement, it is possible to drive the elongated vibratory element 28 in such a manner that the lower edge thereof is vibrating entirely in the same phase. The length of the element may be further extended by adding more transducer units.

For purposes of the present invention, it is believed unnecessary to go into further detail with respect to the transducer units 36 or the mounting of the vibratory unit 28, but detailed explanations thereof may be found in copending applications of the present applicants, Serial No. 116,777, filed June 13, 1961, issued March 10, 1964 as Patent No. 3,123,951, and Serial No. 173,528, filed February 15, 1962, both assigned to the assignee herein.

FIGURE 2a is an end view of the vibratory element 28 in operative relationship to the plastic sheets to be sealed and the anvil 20. The member 28 includes an upper, relatively thick, portion 28a and a lower thinner portion 28b. The resultant mass difference between the upper and lower portions of the vibratory element provides an acoustic transformer action by means of which the amplitude of the longitudinal vibration at the lower extremity of the thin portion 28b is increased with respect to the driving amplitude of the transducer unit applied at the upper surface of the element. This transformation is fully discussed in Re. Patent No. 25,033, assigned to the present assignee. As discussed in the patent, the overall length of the vibrating element is made equal in length to an integral number of half-wave lengths in the material at the frequency of vibration. The transition from the thick to thin portions is made at a nodal point of vibration to minimize stresses. Accordingly, if the element 28 is one half of a wavelength in length, the transition will be made at the quarter wave length point $\lambda/4$.

The lower section 28b of the element 28 is provided with a relatively thin lip portion 28c extending the entire length of the element and arranged so as to produce an asymmetry or mass unbalance with respect to the vertical plane extending through the center of the vibratory element. The effect of the mass unbalance is to transform the longitudinal vibrations applied at the upper edge of the element into an orbital or elliptical vibration at the lowermost edge of the lip portion 28c. This is indicated by the dotted ellipse in the figure.

By varying the unbalance produced by the asymmetrical lip portion 28c, the relative magnitudes of the major and minor diameters of the elliptical motion produced thereat may be controlled. If the lip portion is made relatively large so as to produce an extensive mass unbalance, an ellipse such as shown in FIGURE 2b is produced, having a relatively large transverse component $t$ relative to its longitudinal component, $l$. This type of operation may be particularly advantageous where relatively high melting point materials are being joined and a large component of shear vibration is desired. With a relatively small mass unbalance, the ellipse of FIGURE 2c is produced, wherein the longitudinal component $l$ is considerably greater than the transverse component $t$. This is the type of motion most suitable for the sealing of low melting point materials. It will be understood that the elliptical paths shown in FIGURES 2b and 2c are merely representative of the infinite number of dimensional relationships that may be produced by variation of the magnitude of the lip portion 28c of the vibratory element.

Returning now to the operation of the apparatus of FIGURES 1 and 2a, with the transducer units 36 inoperative, the supporting structure is positioned so that the lower edge of the lip portion 28c of the vibratory member applies a slight compressive force to pinch the sheets 24 and 26 to each other and against the anvil portion 20. Since the contact with the sheet material is very narrow, the unit pressure will be high. Alternating current is now applied to the transducers 36 to vibrate the elements 28. The contact edges along the lower lip 28c will describe the orbital path to apply vibration to the materials to be sealed.

The application of the vibrational energy to the sheet material results in orbital vibrations of the molecules of the material at the frequency of vibration. The molecular vibration does not itself cause heating of the material, but any object contacting its surface will cause heating of the area of contact. While the exact theory to explain this phenomenon is not known for certain, it is believed to be due to the fact that the vibrations of the molecules at the surface of the material in direct contact with the vibrating device, which molecules are orbitally vibrating, impinge upon the relatively stationary surface molecules of the other material brought into contact with it. This results in rapid heating of the contact surface.

In accordance with this theory, the application of vibratory energy to the upper plastic sheet 26 causes vibration of the molecules thereof and resulting heating of the area of contact with sheet 24. The heating effect will extend over the entire area of contact and accordingly, the resultant weld or seal will be effected over the complete area of overlap. Although not illustrated in the figure for the sake of clarity, it will be realized that upon the heating and resulting fusion of the two sheets of material, the area of the weld will tend to decrease in thickness to substantially the thickness of a single sheet of material.

FIGURE 3a illustrates, in view similar to that of FIGURE 2a, a modification of the vibratory member 28 in which a bi-directional motion of a different character is achieved at the lower contact edge. The vibratory member 40 includes an upper relatively thick portion 40a and a lower relatively thin portion 40b. As in the case of the element of FIGURE 2a, the transition from thick to thin portions occurs approximately at the mid or quarter wave point of the element. Also as in the element of FIGURE 2a, this mass transition provides impedance translation which increases the amplitude of the vibration at the lower edge of the narrow portion 40b. However, as distinguished from the device of FIGURE 2a, the motion of the lower contact edge, rather than being orbital or elliptical in path, is angular, as indicated by the dotted line and arrows.

Referring to FIGURE 3b, this angular motion may be resolved to longitudinal, L, and transverse, T, components, the relative magnitudes of which may be varied by varying the thickness of the lower portion 40b of the member. It has been found that if the lower portion 40b is made sufficiently thin, vibration will produce a flexing of the lower portion of the member of such character as to produce orbital vibration at its lower edge. However, a member of this type is most effectively used in its angular vibratory mode, as illustrated.

Another modification of the vibratory element is shown in FIGURE 4. As opposed to the integral construction of the tools of FIGURES 2a and 3a, the tool of FIGURE 4 is fabricated in separable sections. The main vibratory member 44 may be similar in all respects to the upper portions 28a and 28b of the tool 28 in FIGURE 2a, lacking however, the lip portion 28c thereof. In place of the latter, there is provided an elongated member 46 of generally L-shaped cross-section, which is secured to the lower end of the element 44 by means of bolts 48. The member 46 includes a horizontal portion 46b of any desired length, and a generally vertical portion 46a whose lowermost edge constitutes the contact portion of the apparatus. One or more washers 50, of acoustic vibration transmitting material, may be used to space the member 46 from the element 44. As a result of the flexural vibrations induced in the horizontal leg of the member 46, the contact portion 46a has imparted to it an orbital or elliptical vibration, similar to that discussed with respect to FIGURES 2a, b and c.

In use, the device of FIGURE 4 will operate in a manner similar to that discussed with respect to FIGURES 2a and 3a. It has the advantage thereover in that the working element 46 may be readily changed to provide elliptical motions having various ratios of major to minor diameters, thereby providing an element useable with the materials of both high and low melting points. Only one main vibratory element 44 is required with this device which with a number of relatively inexpensive members 46 is capable of universal application.

The vibrating member 28 of FIGURE 1 may also be fabricated to provide a seal or weld along a curvilinear path of any desired configuration. In FIGURE 5 there is shown a vibratory element similar to element 28 of FIGURE 1, but formed to provide a seal along a modified S-shaped configuration. As will be appreciated, the vibratory element may be so shaped as to provide seals made up of a plurality of straight line elements intersecting one another at any desired angles, or may be extended to seal along a closed path, such as a circle or rectangle.

Figure 6B:
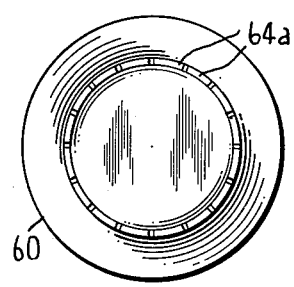

A vibratory element for proving closed contour sealing around a circular path is illustrated in FIGURES 6a and 6b. As shown in FIGURE 6a, the cylindrical element 60 includes a relatively massive upper portion 60a and a smaller diameter end portion 60b. As in the case of the rectangular vibrator of FIGURE 1, the change in mass provides an acoustic impedance transformation which amplifies the magnitude of the vibration at the free end. Ultrasonic energy from the transducer, such as 36 (FIGURE 1) is supplied to the left hand end of the unit via coupling element 62.

The right hand or output end of the vibrating element 60 is hollowed out to provide a relatively thin cylindrical end section 64. The cylindrical section is provided with a plurality of slits evenly spaced about the circumference to provide a plurality of similar vibrating fingers or sections 64a. The individual sections 64a, when subjected to vibrations imparted thereto from the tool body 60, will be vibrated in a flexural mode whereby each output edge will follow an elliptical path. By spacing the slits equally, and making them all of the same width, all of the elements 64a will elliptically vibrate in phase. Although the body of the tool 60 has been illustrated as being solid, it will be understood that the important criteria for obtaining elliptical vibrations of the element 64a is that the thickness of the cylindrical section 64 must be less than that of the main body of the vibrating element 60. Therefore, element 60 may be a partially or completely hollow cylinder having walls of a thickness greater than that of the cylindrical section 64, and need not be completely solid.

Figure 7A:
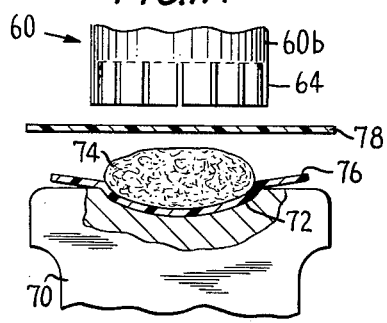
FIGURES 7a and 7b illustrate the use of the device of FIGURES 6a and 6b for the sealing of perishable products.
Figure 7B:
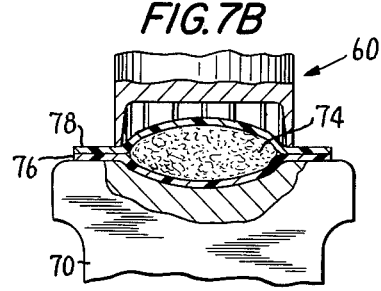

An application of the cylindrical vibratory element 60 of FIGURES 6a and 6b is shown in FIGURES 7a and 7b. In the example illustrated, the device is being used to seal a quantity of a perishable substance, such as hamburger, between two sheets of plastic material. As shown, an anvil 70 is provided having a depression 72 of desired shape in its upper surface, designed to accommodate the particular material to be sealed. With the tool 60 raised out of operative relationship to the anvil, a lower plastic sheet 76 is arranged on the anvil portion 70 and the measured quantity of substance to be sealed 74 is placed thereon as shown. The upper layer of plastic material 78 is then placed on top of the substance 74.

Referring now to FIGURE 7b, with the upper plastic sheet 78 in place, the tool 60 is lowered to compress the plastic sheets into contact with one another along the peripheral edge of the fiingers 64a of the element. Vibratory energy is supplied to the element 60 by means of the transducer, and in accordance with the discussion hereinabove, the elliptical vibration induced at the contact ends of the fingers 64a produces the sealing of the two plastic sheets. Since, as discussed in connection with FIGURES 1 and 2a, the sealing between the layers of plastic is effected over its entire area of contact, the small spaces between the fingers of the vibrating element do not leave gaps in the seal through which air may enter. As an additional safeguard however, the transducer may be rotated slightly, a matter of several thousandths of an inch, while it is in vibratory contact with the plastic sheets, to thereby prevent any possible gaps in the seal from occurring.

In the sealing example illustrated, the substance to be incased has been shown as being generally elliptical in cross and of circular shape. It will be understood, of course, that any cross-sectional shape may be accommodated, by providing a suitably shaped recess in the anvil 70 and that the vibratory element 60, rather than being limited to a circular contour, may be rectangular, triangular or of any other desired configuration.

Figure 8:
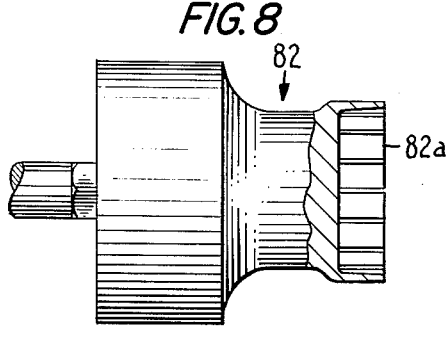

Another embodiment of the closed contour vibratory element according to the invention is shown in FIGURE 8. Except for the configuration of the contact fingers 82a, the element 82 is similar to that of FIGURE 6a in all major respects. The output elements 82a however, rather than following the outer cylindrical surface of the element 82, are jogged or offset from the outer surface thereof. This construction tends to increase the flexural vibration induced in the individual fingers to thereby increase the transverse component of the elliptical motion, as compared with the structure of FIGURE 6a. As has been discussed above, an increased transverse component of motion is desirable with materials of high melting points.

Figure 9:
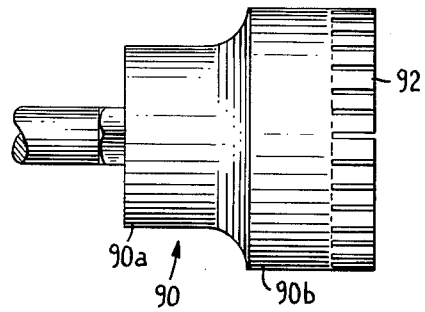

The vibratory element 90 of FIGURE 9 likewise produces a closed contour seal but is reversed in overall configuration to the tools of FIGURES 6a and 8. Although still functioning as an acoustic impedance transformer, since the input end 90a is of smaller diameter than the output end 90b, the effect is to reduce the longitudinal component of vibration at the output edge. As a result, a large part of the acoustic energy applied from the transducer is converted into transverse vibration at the output edge of the fingers 92. Therefore, a vibratory element of this type is particularly applicable to the sealing or welding of high melting point materials such as metals.

In addition to the above described configurations, it will be realized that many intermediately proportioned elements may be fabricated to meet specific sealing problems.

In accordance with another feature of the invention, any of the vibrating elements illustrated herein may be provided with a cutting edge for simultaneously sealing and severing sheet materials. In FIGURE 10a, a vibratory element 102, similar to element 28 in FIGURE 1, is shown in operative relationship with respect to anvil 104. Sheets of materials 106 and 108 are in position to be sealed or welded by the operation of the apparatus. As seen best in FIGURE 10b, the vibratory element 102, in addition to the pending lip portion 102c is provided with a further extension along the contact edge 103, in the form of a knife edge. The anvil 104 is provided with a depressed segment 105 adapted to receive the knife edge 103 when the vibratory element 102 is lowered into contact with the plastic sheets.

Upon application of vibratory energy to the element 102 to effect the sealing, the knife edge 103 severs the sheet materials along the entire length of the transducer as indicated in FIGURE 10a. At the same time, the edges of the sheets 106, 108 are being sealed in the usual manner. The simultaneous sealing and cutting is of particular advantage where it is desired that the seal be at the extreme end of the sheets to be joined or, where a repetitive sealing process is used to produce a multiplicity of similar items, such as plastic bags, from a roll of material. The knife edge may also be applied to the tools shown in FIGURES 5, 6a, 8 and 9 to trim the materials sealed thereby.

One of the advantages of the use of the novel method and apparatus of the present invention is the speed of sealing effected and the avoidance of thermal distortion in the area of the seal. These favorable characteristics lend the invention to a wide variety of fabricating applications. An example of this versatility is shown in FIGURES 11a through 11b, wherein a drinking cup, formed either of solid plastic or plastic coated paper is fabricated.

Starting with the usual blanks of material 110 and 114, the body of the cup is formed by rolling the blank 110 to provide slight overlap and sliding the resultant conical section over an anvil portion 116, which may be supported in cantilever fashion. An elongated vibratory element, of the type shown in FIGURE 1 is then applied to the area of overlap to effect the seal along the entire length of the cup. The body of the cup is then placed on a conically shaped anvil or support 120 for a second sealing process. At the upper end of the anvil 120 the tab edge 112 of the cup body 110 is pressed over to form a slight flange and the cup bottom blank 114 placed thereover .s shown. A cylindrical sealing element 122, of the type shown in FIGURES 6a, 8 or 9, is then brought into sealing engagement therewith and the cup bottom 114 sealed to the body portion 110 around the entire lower periphery, thereby making a liquid-tight seal therebetween.

The completed cup is shown in FIGURE 11b, with a suitable handle 126 affixed thereto by sealing in accordance with the invention. The latter may be performed while the cup body is still on the anvil 116. The integrity of the seals produced by the process and apparatus of the present invention permits a leak-proof liquid container to be made and the rapidity of the operation enables the cups to be made at great speed. Furthermore, by using the elliptical vibration techniques in accordance with the present invention, plastic coated paper may be used without danger of burning the paper or thermally distorting the relatively thin plastic coating thereon.

If desired, the elongated vibratory elements of FIGURES 1, 5, and 10a may be provided with a plurality of narrow, vertical slots in their respective lip portions, such as illustrated in FIGURE 12. The slots 132 serve to increase the orbital vibration of the lip of the element 130, by segmenting it into a plurality of individual fingers, in the manner discussed in connection with the device of FIGURES 6a and 6b. To insure completeness of the seal, slight lateral oscillation of the element may be provided, as indicated by the dotted arrow.

It will be apparent from the foregoing, that the principles of the present invention may be applied to a wide range of functions. Various modifications in shapes of the vibratory elements will occur to those skilled in the art to accommodate different shapes and forms of seals. Accordingly, it is intended that the scope of the present invention be limited only as set forth in the appended claims.

We claim:

1. A method of joining materials, at least one of which is fusible, with the aid of a force-applying member having a narrow contact edge of substantial extent relative to its width, said contact edge being slotted to provide a plurality of segments, comprising the steps of overlapping said materials in contact with each other, positioning said member such that said contact edge applies a small compressive force to said materials along a line traversing the area of overlap, vibrating the contact edge of said member at an ultrasonic rate to apply an additional recurring force to said materials along said line with said recurring force having a first substantial component normal to the surfaces of said materials and a second substantial component perpendicular to said edge and parallel to said surfaces, and simultaneously oscillating said member in the direction in which said contact edge extends to correspondingly move the segments thereof over a finite distance in said direction, whereby said materials are joined within their area of overlap.

2. The method according to claim 1 in which the ratio of said first and second components of said recurring force is selected in accordance with the melting point of the materials to be joined, the recurring force applied to higher melting point materials having a relatively high first component and low second component and low melting point materials having a relatively low first component and high second component.

3. The method according to claim 1, wherein said narrow contact edge describes a circle and said edge is oscillated about the center thereof.

4. In apparatus for sealing two layers of thermoplastic material to each other by the application of ultrasonic energy, a unitary vibratory member capable of supporting vibrations at an ultrasonic frequency comprising first and second coaxial cylindrical portions of substantially different masses, the combined length of said portions being equal to an integral number of half-wavelengths of said ultrasonic frequency in said member, said portions meeting substantially at a nodal plane of vibration in said member, means to impart ultrasonic vibrations longitudinally of said member to the end surface of said first portion, and a relatively thin cylindrical contact edge formed at the end surface of said second portion and being divided into a plurality of individual segments of equal arcuate length by a plurality of narrow equally spaced slots provided therein; the individual segments of said contact edge adapted to vibrate with components of vibrations both parallel to and perpendicular to the axis of said member.

5. A vibratory member according to claim 4 wherein each of said segments is radially offset from the surface of said second portion with respect to the axis of said member.

6. In apparatus for forming a bond between two or more pieces of sheet material by the application of ultrasonic energy, a vibratory member capable of supporting vibrations at an ultrasonic frequency, an extended, narrow, contact edge formed on said member adapted to vibrate with orthogonally related components of motion, and a cutting edge extending beyond said contact edge for severing said sheet material along a line adjacent the bond to be formed therebetween.

References Cited by the Examiner
UNITED STATES PATENTS

| | | | |
|---|---|---|---|
| 2,633,894 | 4/1953 | Carwile | 156—73 |
| 2,707,821 | 5/1955 | Sowter | 29—470.1 XR |
| 2,894,323 | 7/1959 | Sowter | 29—470.1 XR |
| 3,022,814 | 2/1962 | Bodine | 156—73 |
| 3,088,343 | 5/1963 | Balamuth et al. | 29—470.1 XR |
| 3,101,634 | 8/1963 | Cooper | 228—1 |
| 3,121,353 | 2/1964 | Scarpa et al. | 228—1 |
| 3,184,841 | 5/1965 | Jones et al. | 29—470.1 XR |

FOREIGN PATENTS

| | | |
|---|---|---|
| 1,230,674 | 9/1960 | France. |
| 9,142 | 10/1958 | Japan. |

JOHN F. CAMPBELL, *Primary Examiner.*